Patented June 10, 1947

2,421,979

UNITED STATES PATENT OFFICE 2,421,979

PRODUCTION OF FLUORESCENT COATINGS

Charles H. Bachman, Scotia, and Vincent J. Schaefer, Schenectady, N. Y., assignors to General Electric Company, a corporation of New York No Drawing. Application December 31, 1943, Serial No. 516,510

4 Claims. (Cl. 117—33.5)

The present invention relates to the production of thin films or coatings on a support or base member. In particular, our invention relates to the production of thin films of luminescent material in a condition of extreme homogeneity and freedom from pinholes and other imperfections. Fluorescent screens made by the practice of our invention comprise an improvement over screens made by the settling out of powder suspended in an aqueous solution.

For the preparation of exceedingly thin and homogeneous films of fluorescent material, that is, films which are free from imperfections, such as minute pores or "pinholes," the methods heretofore used have not been wholly satisfactory.

In accordance with one feature of our improved method the solid material to be deposited in film form after being converted to a state of colloidal fineness is suspended in a non-aqueous liquid of lower viscosity than water and from such suspension is allowed gravitationally to settle on the desired support.

Another important feature of our invention is the presence in such suspending liquid of a small amount, ordinarily not exceeding a few per cent, of a liquid material of lower volatility which is soluble in the suspending liquid.

Our invention is applicable to the formation of fluorescent screens in cathode ray devices of various kinds and in particular to the production of fluorescent screens in electron microscopes. U. S. Patent 2,277,414, patented March 24, 1942, to Simon Ramo, shows conventionally an electron microscope in which an image is produced on a fluorescent film. A more highly developed electron microscope is shown in Bachman and Ramo application Serial No. 467,530, filed December 1, 1942. In such devices a fluorescent film may be employed in the form of a deposition on glass plates.

Our invention will be illustrated by a specific embodiment, but it not limited thereto in its application.

The chosen phosphor (for example, zinc silicate) is comminuted by any suitable method to a state of extremely fine subdivision. For example, the chosen phosphor may be ground in a ball mill in the presence of a suitable carrier liquid, such as amyl acetate. As only the finer powder can be used for the production of very thin, uniform screens, the ball-milled material next is graded for example, by air settling or by flotation in the liquid chosen for carrying out the deposition step. Diethyl ether $(C_2H_5)_2O$ is suitable for this purpose but various other volatile liquids of low viscosity may be used, as for example ethylene dichloride, petroleum ether, chloroform and normal pentane. The larger particles settle out rapidly from such a suspension and are discarded. No definite rule for the grading of the particles with respect to fineness and length of suspension time in the liquid can be given as this will be determined by the character of film desired and other conditions. In general, the phosphor particles should be so fine as to remain in suspension for about 10 to 25 minutes, the particles settling out too soon being reground.

Advantageously, in order to obtain films of the greatest homogeneity and freedom from pinholes, a small amount of a liquid of lower volatility should be added to the main body of suspending liquid. For example, when the main suspending liquid consists of diethyl ether, a small amount, such as about one per cent, of dioxane $(CH_2)_4O_2$ may be added. Dioxane has a lower vapor pressure than ether and is soluble in water and ether. As will be later more fully explained, the function of such modifier is to retard evaporation of the suspending liquid in its final stage. Other evaporation retarders may be used as, for example, nitrobenzene, amyl acetate and water.

When a desired combination of liquid medium and suspended matter has been prepared, the deposition is carried out by allowing the suspension to stand in an immobile state, preferably shielded from air currents, until the ether or other suspending liquid has been evaporated. The evaporation rate can be accelerated by maintaining the space above the evaporator liquid evacuated to a low pressure. In some cases part of the suspending liquid may be removed in some mechanical way, as by decantation but the removal of a final residue at least should occur by evaporation.

As the ether or other suspending liquid evaporates, the suspended solid material begins to settle to the bottom. In case it is desired to coat articles, for example glass plates, they are placed on the bottom of the container so as to receive the deposition.

The amount of material in the screen, that is, the thickness of the screen, depends on the concentration of the suspension and the amount of suspension. These factors are easy to control. Removal of the liquid by evaporation without draining the last portion of the liquid is a decided advantage. Streaks and drain marks are avoided. When the retarder of evaporation is omitted, it is found that the evaporation is too fast in the last stage. Localized minute areas of excessively fast evaporation occur (chimney effects) which tend to push the powder apart in local regions and leave undesired pinholes. These effects are completely removed by the presence of the retarder. As the evaporation proceeds, the concentration of the retarder increases until finally the evaporation rate becomes that of the retarder which is left. The last remaining film of retarder, as for example dioxane, apparently has the physical properties such as wetting ability, vapor pressure, surface tension, etc., which cause screens having a high degree of uniformity to be deposited.

What we claim as new and desire to secure by Letters Patent of the United States is:

1. The method of applying fluorescent material to a support which consists in causing particles of desired fluorescent material in a finely divided state to settle gravitationally as a coating upon a chosen support from a suspension of such particles in a liquid comprising mainly a component of materially higher volatilty and lower viscosity than water and a small amount not exceeding a few per cent of a material capable of retarding evaporation of residues of the suspending liquid at the close of a hereinafter specified evaporation step and removing said liquid solely by evaporation from the deposited coating whereby the homogeneity of said coating is preserved.

2. The method of applying fluorescent material to a solid support which consists in suspending such material in a finely divided state in a body of liquid having higher volatility and lower viscosity than water, said suspending liquid containing dissolved therein not substantially exceeding one per cent of modifying liquid of materially lower volatility, causing the suspended material to be deposited gravitationally as a film while holding the suspending liquid in an immobile state and removing said liquid without disturbing a residual amount thereof, such residual amount being removed solely by evaporation.

3. The method of applying a film of fluorescent material upon a support which consists in forming a suspension of said material comminuted to a state of colloidal fineness in a suspending medium consisting of a volatile liquid containing in solution about one per cent of less volatile liquid, gravitationally depositing said material from the suspension and evaporating a residual portion of said suspending medium while held shielded from air currents and held in an immobile state.

4. The method of depositing a film of finely divided material on a solid support which consists in suspending said material in ethyl ether having dissolved therein some dioxane, causing a desired layer of said suspended matter to gravitationally settle upon such support, and removing by evaporation the suspending liquid covering said layer, whereby the increasing concentration of dioxane as the ether evaporation promotes homogeneity of film formation.

CHARLES H. BACHMAN.
VINCENT J. SCHAEFER.

REFERENCES CITED

The following references are of record in the file of this patent:

UNITED STATES PATENTS

| Number | Name | Date |
|---|---|---|
| 2,062,858 | Batchelor | Dec. 1, 1936 |
| 2,328,292 | Painter | Aug. 31, 1943 |
| 2,091,277 | Fritze et al. | Aug. 31, 1937 |
| 2,309,612 | Holman | Jan. 26, 1943 |